United States Patent [19]
Lerner

[11] 3,807,230
[45] Apr. 30, 1974

[54] DOUBLE FLOWMETER ROTOR ASSEMBLY

[75] Inventor: Julius Lerner, Broomall, Pa.

[73] Assignee: Sun Oil Company of Pennsylvania, Philadelphia, Pa.

[22] Filed: Dec. 4, 1972

[21] Appl. No.: 312,235

[52] U.S. Cl............................................. 73/231 R
[51] Int. Cl. ............................................. G01f 1/10
[58] Field of Search..... 73/231 R, 231 M, 230, 229; 415/60; 137/329, 329.02

[56] References Cited
UNITED STATES PATENTS

| | | | |
|---|---|---|---|
| 1,483,656 | 2/1924 | Fisher | 137/329.02 |
| 3,483,885 | 12/1969 | Leathers | 137/329.02 |
| 3,404,569 | 10/1968 | Young | 73/231 R |

*Primary Examiner*—James J. Gill
*Assistant Examiner*—Anthony V. Ciarlante
*Attorney, Agent, or Firm*—George L. Church; Donald R. Johnson; Frank A. Rechif

[57] ABSTRACT

An imperforate support is pivotally mounted within an opening in a pipe and is sealed around its edges to the wall defining this opening, the support being rotatable about its pivot by means of a handle located outside the pipe. Two turbine-type flowmeters are journaled individually in separate bearings carried by the support, one bearing being mounted on each respective one of the two opposite faces of the support.

3 Claims, 3 Drawing Figures

PATENTED APR 30 1974          3,807,230

DOUBLE FLOWMETER ROTOR ASSEMBLY

This invention relates to a flowmeter rotor assembly, and may be considered as an improvement over U.S. Pat. No. 3,404,569, dated Oct. 8, 1968.

The patent mentioned discloses a turbine-type flowmeter the rotor of which is supported by a rotatable section of the wall of the pipe through which the fluid being measured is flowing. This arrangement allows the rotatable section of pipe to be rotated, removing the rotor assembly from the stream inside the pipe to a compartment on the outside of the pipe, which can then be opened for replacing or servicing the rotor assembly. After such replacement or servicing, the rotatable section of pipe may be rotated again, to return the new or repaired rotor assembly to the flowing stream.

One of the main features of the patented construction is that the flowmeter rotor may be maintained (replaced or repaired) without shutting off the flow of fluid in the line wherein the flowmeter has been operating, or without interfering with such flow. However, during such maintenance (when the rotor, of necessity, is in the outside compartment, and is not coupled to the fluid stream), the fluid flow in the pipe is of course not being measured, which is disadvantageous.

In addition, the seal around the outer edges of the rotatable pipe section or support sometimes fails, which means that the outside compartment cannot be opened (for repair or replacement of the flowmeter rotor) until the fluid flow in the line is shut off. Thus, under these conditions it would be impossible to measure the fluid flow in the line for an extended period of time, since the line is intended to be in continuous operation and is only very rarely (if ever) shut off. This is obviously very undesirable.

An object of the present invention is to provide an improved rotor assembly for turbine-type flowmeters.

Another object is to provide a rotor assembly for flowmeters which in effect includes a spare rotor which can be used while a damaged rotor is being repaired or replaced.

A further object is to provide a double rotor assembly for flowmeters.

A still further object is to provide a flowmeter rotor assembly, for use with continuously-operating lines, which gives improved efficiency and effectiveness of operation.

The objects of this invention are accomplished, briefly, in the following manner: The rotatable section of the pipe (which carries the flowmeter sensing elements) is made symmetrical, with a rotor on each respective face thereof. Thus, when the rotatable section is rotated to remove a damaged rotor from the fluid stream inside the pipe, a new rotor is automatically introduced at the same time into the fluid stream.

A detailed description of the invention follows, taken in conjunction with the accompanying drawing, wherein.

Figure 2:
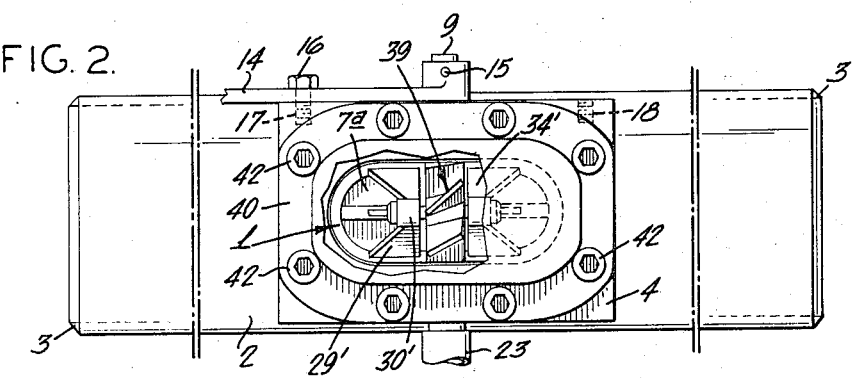
FIG. 2 is a plan (top) view of the flowmeter arrangement, partly broken away in order to show details.

The flowmeter rotor assembly of this invention, which is denoted generally by numeral 1, is mounted on a piece of pipe 2 whose opposite ends are beveled at 3, for welding into a main line (not shown) wherein the fluid flow is to be measured. It is assumed that the main line is in continuous operation, and it is desired that the flowmeter be so arranged that a flowmeter turbine rotor can be removed for maintenance without shutting off the flow in the main line, and without stopping the flow measurement (except perhaps only momentarily); for obvious reasons, the assembly of this invention is termed an "in-line" flowmeter rotor assembly.

A saddle member 4, of rectangular outer configuration, is welded into a rectangular opening 5 provided in the wall of pipe 2. The longer dimension of opening 5 is parallel to the longitudinal axis of pipe 2. The inner surface of saddle 4 (at its edges, around a central opening 6 which will be referred to further hereinafter) has a curvature which matches the curvature of the inner wall of pipe 2, as may be seen in FIG. 3, and the outer surface of this saddle is planar. Saddle 4 has an elongate (oblong) central opening 6 therein, the two longer sides of this opening being straight and the two ends thereof being rounded (arcuate); an opening of this shape is generally termed "obround." A base member or support 7, having an outer "obround" configuration which matches that of opening 6, is positioned within said opening. Support 7 is made of a non-magnetic (paramagnetic) material such as stainless steel, and it has two opposite substantially imperforate faces. In the central region of the longer sides of the "obround" support 7, this support has a somewhat greater thickness than does the remainder of the support, and a bore 8 is drilled through this thickened region, this bore extending entirely through the shorter dimension of the support, in a direction at right angles to the longitudinal axis of pipe 2; bore 8 is isolated by the material of the support from the two imperforate faces previously referred to.

Support 7 is held in position within opening 6 mainly by means of a shaft 9 (made of a non-magnetic material such as stainless steel) which is mounted in bore 8. One end of shaft 9 is located approximately at the center of the length of bore 8 (i.e., approximately at the center of support 7), and the opposite end of this shaft extends rotatably through an aligned bore 10 formed in saddle 4, centrally of the length thereof and extending in a direction at right angles to the longer dimension of the saddle and to the longitudinal axis of pipe 2. A set screw 11, which threads into a tapped hole provided in one face 7a of support 7 and whose inner end extends into a transverse hole in shaft 9, prevents longitudinal movement of shaft 9 relative to support 7.

Shaft 9, whose outer end extends beyond (i.e., to the outside of) saddle 4 (and also pipe 2), provides a means which is operable externally of pipe 2 for rotating support 7 about an axis (the longitudinal center line of the shaft) lying at right angles to the longitudinal axis of pipe 2 (and also, of course, to the normal direction of fluid flow in this pipe). In order to positively secure shaft 9 to support 7 for rotation of the latter by the former, a keyway is cut into the wall of bore 8, and a key 12 is cemented in this keyway, one end of key 12 being located at the approximate center of the length of bore 8 and this key extending in the direction of the length of shaft 9 (i.e., to the right of the vertical midplane in FIG. 3). A matching keyway (which may be seen in FIG. 1), for reception of key 12, is provided at the inner end of shaft 9.

A circumferential groove, for reception of an O-ring gasket 13, is provided in shaft 9, in the portion thereof which passes through bore 10, this O-ring providing a seal in bore 10 and preventing leakage of fluid around shaft 9, in bore 10.

For manually rotating shaft 9, and thereby also support 7, an operating handle 14 is pinned at 15 to the outer end of shaft 9. Handle 14 is rectangular in cross-section and extends at right angles to shaft 9; this handle rotates in a vertical plane which is parallel to the vertical plane passing through the longitudinal axis of pipe 2. Handle 14 is located externally of saddle 4. It may be seen that by manually rotating the handle 14 as indicated generally in dot-dash lines in FIG. 3, shaft 9 and support 7 (keyed thereto) may be rotated from one terminal position illustrated in the drawing (wherein one face 7a of support 7 is uppermost see FIG. 3) through 180° (about the axis of shaft 9) to another terminal position (wherein the other face 7b of support 7 is uppermost), and vice versa. In order to hold handle 14 in the position illustrated, a bolt 16 passes through a clearance hole in handle 14 and threads into a tapped hole 17 provided in saddle 4. Another tapped hole 18 is provided in saddle 4, on the opposite side of shaft 9 from hole 17, for reception of bolt 16; when handle 14 is in a position 180° from that illustrated, bolt 16 may be passed through handle 14 and threaded into hole 18, thereby to hold handle 14 in this other or 180° position.

A stub shaft 19 (FIG. 3), made of a ferromagnetic material such as mild steel, helps to hold support 7 in position within opening 6. Stub shaft 19 is mounted in bore 8 and is secured in this bore by means of a set screw 20 which threads into a tapped hole provided in support face 7a and whose inner end bears against stub shaft 19. One end of shaft 19 is located approximately at the center of the length of bore 8 (abutting the inner end of shaft 9), and the opposite end of shaft 19 extends into an aligned bore 21 formed in saddle 4 opposite to and aligned with bore 10. The outer end of stub shaft 19 abuts a metal disc 22 (made for example of mild steel) closing the inner end of a nipple 23 which is threaded into the enlarged-diameter outer end of bore 21. In operation, nipple 23 contains a pickup coil (not shown) which provides electrical pulses as one of the rotors of the flowmeter assembly of the invention rotates.

A circumferential groove, for reception of an O-ring gasket 24, is provided in shaft 19 near the outer end thereof, this O-ring providing a seal in bore 21 and preventing leaking of fluid around shaft 19, in bore 21.

A groove 25 which opens outwardly is provided entirely around the "obround" support 7, this groove communicating, at the center of one of the longer sides of the support, with a substantially circular groove 26 around shaft 9 and, at the center of the other of the longer sides of the support, with a similar substantially circular groove 27 (see FIG. 3) around stub shaft 19. An O-ring gasket 28 is contained in the "obround" groove 25, such that it follows about half of the groove 26 around shaft 9 and about half of the groove 27 around stub shaft 20. The O-ring 28 is so positioned that, in the position of support 7 illustrated, this O-ring lies in the "lower" portion of groove 26 ("below" shaft 9) and in the "lower" portion of groove 27 ("below" shaft 20); see FIG. 3. The O-ring 28 provides a seal in opening 6 and prevents leakage of fluid around support 7, in opening 6. In this connection, it will be recalled that the two opposite faces 7a and 7b of support 7 are substantially imperforate.

Figure 3:
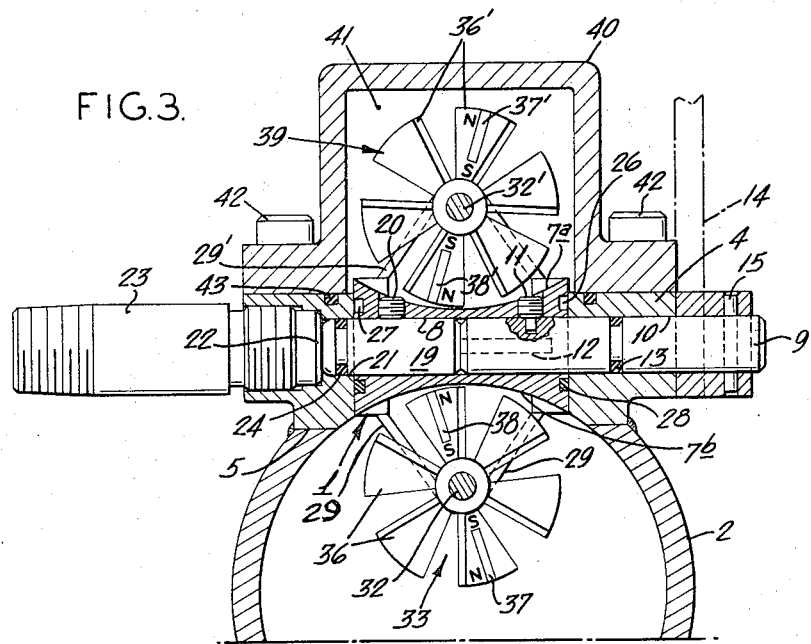
FIG. 3 is a partial section (on an enlarged scale) taken on line 3—3 of FIG. 1.

The opposite faces 7a and 7b of support 7 each have a curvature which matches that of the inner wall of pipe 2 (see FIG. 3). Extending outwardly away from the curved face 7b, on one side (for example, the left-hand side in FIG. 1) of the vertical midplane passing through its longer sides, is a set of three angularly-spaced ribs 29 (see also FIG. 3) which converge in the direction proceeding away from the support face. Ribs 29 are integral with support 7 and their convergent ends are integral with a boss 30 which is machined to provide a bushing in which is threadedly mounted a bearing holder 31. Holder 31 carries a bearing in which is journaled one end of the shaft 32 for the rotor 33 of a turbine-type flowmeter. A similar set of ribs 34 on the opposite side of the vertical midplane of support 7 mounts a similar fixed bearing holder 35 at the other side of the flowmeter rotor 33; holder 35 carries a bearing for journaling the other end of shaft 32. By means of the mounting arrangement just described, the flowmeter rotor 33 is rotatably mounted on the face 7b of support 7 (to wit, the bottom face in FIGS. 1 and 3).

The flowmeter rotor 33 comprises (see FIG. 3) six curved, angularly-spaced turbine vanes 36 which extend in radial directions with respect to shaft 32, and which are integral with or fixedly secured to such shaft. Two permanent magnets 37 and 38 are secured to two respective diametrically-opposite vanes 36 of rotor 33 (see FIG. 3).

Figure 1:
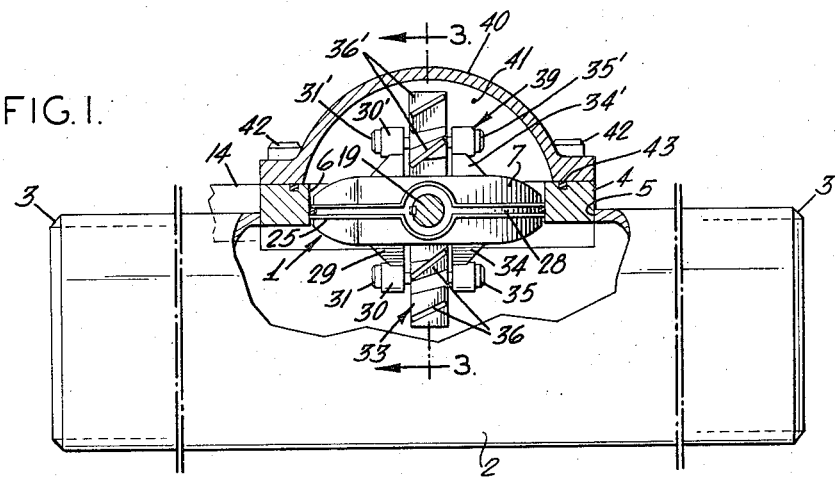
FIG. 1 is a front elevation (partly broken away) of a flowmeter arrangement according to this invention.

In the terminal position of support 7 illustrated particularly in FIGS. 1 and 3, the rotor 33 is rotated by the motion of the fluid in pipe 2, as a result of the action of the fluid on vanes 36. The movement of the rotor magnets 37 and 38 past the shaft 19 (made, as stated, of a ferromagnetic material, the support 7 being made of a non-magnetic material) causes magnetic pulses to be transmitted to the end of the coil (not shown) which is contained in nipple 23, thereby forming electrical pulses in the same manner as most turbine flowmeters.

A duplicate turbine-type flowmeter rotor 39 is mounted on the curved face 7a of support 7. The rotor 39 is exactly similar in construction to the rotor 33, previously described, and is mounted on face 7a in exactly the same manner as is rotor 33 on face 7b, previously described. Hence, the description will not be repeated; elements (for rotor 39, on support face 7a) similar to those previously described (for rotor 33, on support face 7b) are denoted by the same reference numerals, but carrying prime designations.

A domed cover 40, of approximately "obround" outer configuration but with its ends somewhat flattened to match the straight ends of saddle 4, overlies the central opening 6 of saddle 4 and provides a chamber 41 between the lower (or inner) surface of the dome and support 7. Chamber 41 is of a size sufficient to accommodate therein either the rotor 33 or the rotor 39 (see FIG. 1). Cover 40 is flanged at its outer edge and is secured to saddle 4 by means of a plurality of cap screws 42 which pass through clearance holes in the cover and thread into respective tapped holes in saddle 4. An "obround" groove is cut into the upper surface of saddle 4, outside of opening 6 and under cover 40;

an O-ring gasket 43 is seated in this groove and functions to prevent leakage under the cover 40.

In the terminal position of support 7 illustrated in the drawing, rotor 33 is active (being coupled to the fluid flowing in pipe 2) and rotor 39 is inactive (being located within the chamber 41, and isolated from the fluid in pipe 2). When maintenance of the rotor 33 is necessary (e.g., cleaning or replacement of the bearings 31 and 35), screw 16 is removed from hole 17 and handle 14 is rotated 180°, thereby rotating support 7 about the axis of shaft 9 so that the rotor 33 and bearings 31, 35 are outside of pipe 2, and in the chamber 41 under cover 40. This is the other terminal position of support 7, and in this position O-ring 28 prevents leakage past support 7 into the chamber 41. During the said rotation of handle 14, the fluid in pipe 2 can continue to flow freely.

The rotation of handle 14 through 180°, as above described, causes the rotor 39 (the duplicate rotor) to swing downwardly, into pipe 2, as rotor 33 swings upwardly, into chamber 41. Thus, when the rotatable support 7 is rotated to remove the damaged rotor 33 from the stream inside the pipe 2, the new rotor 39 is simultaneously introduced into the stream inside pipe 2. As a result, the measurement of flow can continue (with rotor 39) while the maintenance of the damaged rotor 33 is taking place.

After the 180° rotation of handle 14, screw 16 is reinserted through the handle and threaded into hole 18. This prevents accidental opening of the pipe 2 while working on the meter parts.

Cover 40 may then be removed for maintenance work on the damaged rotor 33. This exposes the rotor 33 and its bearings 31, 35, which are now outside of pipe 2, for maintenance operations as necessary. The fluid in pipe 2 can continue to flow freely during the entire maintenance operation. Also, during such maintenance operation, the fluid flow measurement can continue, by utilization of the duplicate rotor 39. It is not necessary to shut off the flow in pipe 2; for maintenance, there is no interference with the flow, and flow measurement can be continued. No expensive by-pass and valves are required, and no loss of flow measurement data occurs.

The invention claimed is:

1. In combination with a pipe through which fluid can flow, a support positioned within an opening in the pipe wall and having two opposite substantially imperforate faces; means acting to provide a seal between said support and the wall defining said opening; said support being movable between two positions in one of which a first only of said faces is continuously exposed to the interior of said pipe and in the other of which the second only of said faces is continuously exposed to the interior of said pipe; a first device, responsive to a measurable physical characteristic associated with the flow of fluid in said pipe, carried by said first support face, said first device being continuously immersed in said fluid when said first face is exposed to the interior of said pipe; a second device, duplicating said first device, carried by said second support face, said second device being continuously immersed in said fluid when said second face is exposed to the interior of said pipe; and means operable externally of said pipe for moving said support back and forth between its two positions, thereby to alternatively immerse said devices in said fluid.

2. Combination of claim 1, wherein said devices are flowmeter rotors responsive to the flow rate of fluid which flows in said pipe.

3. Combination according to claim 2, wherein said rotors are journaled individually in bearings mounted respectively on corresponding faces of said support.

* * * * *